US010257669B2

(12) United States Patent
Patel et al.

(10) Patent No.: US 10,257,669 B2
(45) Date of Patent: Apr. 9, 2019

(54) PTX DATA ANALYTIC ENGINE NOTIFYING GROUP LIST OF DETECTED RISK EVENT

(71) Applicant: Kodiak Networks, Inc., Plano, TX (US)

(72) Inventors: Krishnakant M. Patel, Richardson, TX (US); Brahmananda R. Vempati, Dallas, TX (US); Narasimha Raju Nagubhai, Richardson, TX (US)

(73) Assignee: KODIAK NETWORKS, INC., Plano, TX (US)

( * ) Notice: Subject to any disclaimer, the term of this patent is extended or adjusted under 35 U.S.C. 154(b) by 0 days.

(21) Appl. No.: 15/828,085

(22) Filed: Nov. 30, 2017

(65) Prior Publication Data

US 2018/0160278 A1    Jun. 7, 2018

Related U.S. Application Data

(60) Provisional application No. 62/429,013, filed on Dec. 1, 2016.

(51) Int. Cl.
*H04W 4/10* (2009.01)
*H04W 4/90* (2018.01)
(Continued)

(52) U.S. Cl.
CPC ............. *H04W 4/10* (2013.01); *G08B 17/00* (2013.01); *G08B 27/001* (2013.01); *H04W 4/02* (2013.01);
(Continued)

(58) Field of Classification Search
CPC ......... H04W 4/22; H04W 4/90; H04W 12/06; H04W 12/08; H04W 4/10
(Continued)

(56) References Cited

U.S. PATENT DOCUMENTS 3,912,874 A    10/1975 Botterell et al.
4,796,293 A    1/1989 Blinken et al.
(Continued)

FOREIGN PATENT DOCUMENTS

WO    00069189    11/2000
WO    0079825 A1    12/2000
(Continued)

OTHER PUBLICATIONS

ETSI: "ETSI TS 100 812-2 v2.3.1 Terrestrial Trunked Radio (TETRA) Subscriber Identity Module to Mobile Equipment (SIM-ME) interface; Part 2: Universal Integrated Circuit Card (UfCC) Characteristics of the TSIM application", ETSI Technical Specification, Oct. 2003, all pages.
(Continued)

*Primary Examiner* — Philip Sobutka

(57) ABSTRACT

A method of operating a push-to-anything (PTX) platform includes receiving, by a data analytics engine (DAE) of the PTX platform, a first input signal from a first input source; calculating, by the DAE, a risk indicator using the first input signal, the risk indicator indicating a level of a security threat; detecting a risk event, by the DAE, when the risk indicator is above a first pre-determined risk threshold, the first pre-determined risk threshold corresponding to a pre-determined level of security threat above which an emergency response protocol is initiated; generating, by the DAE, a group list in response to detecting the risk event, where the group list comprises one or more client devices of the PTX platform; sending, by the DAE, the group list to a PTX server of the PTX platform; and notifying, by the PTX server, the one or more client devices in the group list of the risk event.

18 Claims, 7 Drawing Sheets

(51) Int. Cl.
*G08B 27/00* (2006.01)
*H04W 4/08* (2009.01)
*G08B 17/00* (2006.01)
*H04W 4/02* (2018.01)
*G08B 31/00* (2006.01)

(52) U.S. Cl.
CPC .............. *H04W 4/08* (2013.01); *H04W 4/90* (2018.02); *G08B 31/00* (2013.01)

(58) Field of Classification Search
USPC .......................................... 455/404.1, 404.2
See application file for complete search history.

(56) References Cited

U.S. PATENT DOCUMENTS

| | | |
|---|---|---|
| 5,353,328 A | 10/1994 | Jokimies |
| 5,442,809 A | 8/1995 | Diaz et al. |
| 5,546,449 A | 8/1996 | Hogan et al. |
| 5,711,011 A | 1/1998 | Urs et al. |
| 5,752,196 A | 5/1998 | Ahvenainen et al. |
| 5,987,318 A | 11/1999 | Alperovich et al. |
| 5,987,331 A | 11/1999 | Grube et al. |
| 6,011,976 A | 1/2000 | Michaels et al. |
| 6,021,326 A | 2/2000 | Nguyen |
| 6,138,011 A | 10/2000 | Sanders, III et al. |
| 6,141,556 A | 10/2000 | Dougherty et al. |
| 6,192,119 B1 | 2/2001 | Wilson |
| 6,304,558 B1 | 10/2001 | Mysore |
| 6,397,054 B1 | 5/2002 | Hoirup et al. |
| 6,405,030 B1 | 6/2002 | Suprunov |
| 6,411,815 B1 | 6/2002 | Balasuriya |
| 6,473,501 B1 | 10/2002 | Paulsrud |
| 6,477,366 B1 | 11/2002 | Valentine et al. |
| 6,477,387 B1 | 11/2002 | Jackson et al. |
| 6,549,773 B1 | 4/2003 | Linden et al. |
| 6,577,874 B1 | 6/2003 | Dailey |
| 6,606,305 B1 | 8/2003 | Boyle et al. |
| 6,628,937 B1 | 9/2003 | Salin |
| 6,661,878 B1 | 12/2003 | Mirashrafi et al. |
| 6,725,053 B2 | 4/2004 | Rosen et al. |
| 6,751,468 B1 | 6/2004 | Heubel et al. |
| 6,801,762 B1 | 10/2004 | Huilgol |
| 6,856,676 B1 | 2/2005 | Pirot et al. |
| 6,865,398 B2 | 3/2005 | Mangal et al. |
| 6,892,074 B2 | 5/2005 | Tarkiainen et al. |
| 6,895,254 B2 | 5/2005 | Dorenbosch |
| 6,898,436 B2 | 5/2005 | Crockett et al. |
| 6,993,355 B1 | 1/2006 | Pershan |
| 6,996,414 B2 | 2/2006 | Vishwanathan et al. |
| 7,026,926 B1 | 4/2006 | Walker, III |
| 7,043,266 B2 | 6/2006 | Chaturvedi et al. |
| 7,082,316 B2 | 7/2006 | Elden et al. |
| 7,085,364 B1 | 8/2006 | Ahmed et al. |
| 7,099,291 B2 | 8/2006 | Harris et al. |
| 7,123,905 B1 | 10/2006 | Allaway et al. |
| 7,170,863 B1 | 1/2007 | Denman et al. |
| 7,231,225 B2 | 6/2007 | Rao et al. |
| 7,236,580 B1 | 6/2007 | Sarkar et al. |
| 7,330,540 B2 | 2/2008 | Darby et al. |
| 7,366,535 B2 | 4/2008 | Glass et al. |
| 7,403,775 B2 | 7/2008 | Patel et al. |
| 7,460,861 B2 | 12/2008 | Zabawskj |
| 7,529,557 B2 | 5/2009 | Farrill |
| 7,689,238 B2 | 3/2010 | Biswas et al. |
| 7,738,861 B2 | 6/2010 | Fournier |
| 7,738,892 B2 | 6/2010 | Ayyasamy et al. |
| 7,738,896 B2 | 6/2010 | Patel et al. |
| 7,751,348 B2 | 7/2010 | Shaffer et al. |
| 7,764,950 B2 | 7/2010 | Patel et al. |
| 7,787,896 B2 | 8/2010 | Kundu et al. |
| 7,797,010 B1 | 9/2010 | Manroa et al. |
| 7,813,722 B2 | 10/2010 | Patel et al. |
| 7,853,279 B2 | 12/2010 | Patel et al. |
| 8,036,692 B2 | 10/2011 | Ayyasamy et al. |
| 8,244,252 B2 | 8/2012 | Descombes |
| 8,369,829 B2 | 2/2013 | Nagubhai et al. |
| 8,478,261 B2 | 7/2013 | Vempati et al. |
| 8,498,660 B2 | 7/2013 | Lawler et al. |
| 8,670,760 B2 | 3/2014 | Lawler et al. |
| 8,676,189 B2 | 3/2014 | Lawler et al. |
| 9,282,130 B1 | 3/2016 | Goepp et al. |
| 2001/0005372 A1 | 6/2001 | Cave et al. |
| 2002/0009990 A1 | 1/2002 | Kleier et al. |
| 2002/0024943 A1 | 2/2002 | Karaul et al. |
| 2002/0077136 A1 | 6/2002 | Maggenti et al. |
| 2002/0086659 A1 | 7/2002 | Lauper |
| 2002/0086676 A1 | 7/2002 | Hendrey et al. |
| 2002/0102989 A1 | 8/2002 | Calvert et al. |
| 2002/0187750 A1 | 12/2002 | Majumdar |
| 2002/0196781 A1 | 12/2002 | Salovuori |
| 2003/0009463 A1 | 1/2003 | Gallant |
| 2003/0016632 A1 | 1/2003 | Refai et al. |
| 2003/0017836 A1 | 1/2003 | Vishwanathan et al. |
| 2003/0078064 A1 | 4/2003 | Chan |
| 2003/0119540 A1 | 6/2003 | Mathis |
| 2003/0148779 A1 | 8/2003 | Aravamudan et al. |
| 2003/0149774 A1 | 8/2003 | McConnell et al. |
| 2003/0153343 A1 | 8/2003 | Crockett et al. |
| 2003/0190888 A1 | 10/2003 | Mangal et al. |
| 2004/0032843 A1 | 2/2004 | Schaefer et al. |
| 2004/0057449 A1 | 3/2004 | Black |
| 2004/0067751 A1 | 4/2004 | Vandermeijden |
| 2004/0095954 A1 | 5/2004 | Varney et al. |
| 2004/0121760 A1 | 6/2004 | Wetman et al. |
| 2004/0127233 A1 | 7/2004 | Harris et al. |
| 2004/0152441 A1 | 8/2004 | Wong |
| 2004/0176100 A1 | 9/2004 | Florkey et al. |
| 2004/0179531 A1 | 9/2004 | Bi et al. |
| 2004/0196826 A1 | 10/2004 | Bao et al. |
| 2004/0203793 A1 | 10/2004 | Dorenbosch |
| 2004/0219941 A1 | 11/2004 | Haaramo et al. |
| 2004/0224710 A1 | 11/2004 | Koskelainen et al. |
| 2004/0228292 A1 | 11/2004 | Edwards |
| 2004/0259580 A1 | 12/2004 | Florkey et al. |
| 2005/0047362 A1 | 3/2005 | Harris et al. |
| 2005/0101308 A1 | 5/2005 | Lee |
| 2005/0111430 A1 | 5/2005 | Spear et al. |
| 2005/0119012 A1 | 6/2005 | Merheb et al. |
| 2005/0143135 A1 | 6/2005 | Brems et al. |
| 2005/0164737 A1 | 7/2005 | Brown |
| 2005/0189337 A1 | 9/2005 | Baune |
| 2005/0192041 A1 | 9/2005 | Oxley et al. |
| 2005/0202807 A1 | 9/2005 | Ayyasamy et al. |
| 2005/0221819 A1 | 10/2005 | Patel et al. |
| 2005/0232241 A1 | 10/2005 | Wu et al. |
| 2005/0239485 A1 | 10/2005 | Kundu et al. |
| 2005/0254464 A1 | 11/2005 | Patel et al. |
| 2005/0261016 A1 | 11/2005 | Patel et al. |
| 2006/0003740 A1 | 1/2006 | Munje |
| 2006/0003751 A1 | 1/2006 | Vo |
| 2006/0019654 A1 | 1/2006 | Farrill |
| 2006/0029189 A1 | 2/2006 | Patel et al. |
| 2006/0030347 A1 | 2/2006 | Biswas |
| 2006/0056361 A1 | 3/2006 | Jiang et al. |
| 2006/0067499 A1 | 3/2006 | Oliveira et al. |
| 2006/0078064 A1 | 4/2006 | Schmidt et al. |
| 2006/0094455 A1 | 5/2006 | Hannu et al. |
| 2006/0116150 A1 | 6/2006 | Bhutiani |
| 2006/0128411 A1 | 6/2006 | Turcanu |
| 2006/0178138 A1 | 8/2006 | Ostroff et al. |
| 2006/0189337 A1 | 8/2006 | Farrill et al. |
| 2006/0198334 A1 | 9/2006 | Civanlar et al. |
| 2006/0229090 A1 | 10/2006 | Ladue |
| 2006/0234687 A1 | 10/2006 | Patel et al. |
| 2007/0037562 A1 | 2/2007 | Smith-Kerker et al. |
| 2007/0037597 A1 | 2/2007 | Biswas et al. |
| 2007/0037598 A1 | 2/2007 | Ayyasamy et al. |
| 2007/0049314 A1 | 3/2007 | Balachandran et al. |
| 2007/0070976 A1 | 3/2007 | Mussman et al. |
| 2007/0094409 A1 | 4/2007 | Crockett et al. |
| 2007/0099609 A1 | 5/2007 | Cai |
| 2007/0133478 A1 | 6/2007 | Armbruster et al. |
| 2007/0133757 A1 | 6/2007 | Girouard et al. |

(56) References Cited

U.S. PATENT DOCUMENTS

| | | |
|---|---|---|
| 2007/0154005 A1 | 7/2007 | Daigle |
| 2007/0189487 A1 | 8/2007 | Sharland et al. |
| 2007/0190492 A1 | 8/2007 | Schmitt |
| 2007/0190984 A1 | 8/2007 | Ayyasamy et al. |
| 2007/0197234 A1 | 8/2007 | Gill et al. |
| 2007/0204039 A1 | 8/2007 | Inamdar |
| 2007/0217591 A1 | 9/2007 | Yasuma |
| 2007/0218885 A1 | 9/2007 | Pfleging et al. |
| 2007/0253347 A1 | 11/2007 | Patel et al. |
| 2008/0064364 A1 | 3/2008 | Patel et al. |
| 2008/0126230 A1 | 5/2008 | Bellora et al. |
| 2008/0147671 A1 | 6/2008 | Simon et al. |
| 2008/0299953 A1 | 12/2008 | Rao |
| 2009/0092116 A1 | 4/2009 | Jiang et al. |
| 2009/0119678 A1 | 5/2009 | Shih et al. |
| 2009/0149167 A1 | 6/2009 | Patel et al. |
| 2009/0209235 A1 | 8/2009 | Lawler et al. |
| 2009/0279512 A1 | 11/2009 | Fujishima |
| 2009/0325540 A1 | 12/2009 | Yach et al. |
| 2010/0016008 A1* | 1/2010 | Brewer ................ H04W 4/10 455/518 |
| 2010/0035593 A1 | 2/2010 | Fanco et al. |
| 2010/0100938 A1* | 4/2010 | Ramic ................ H04L 63/102 726/4 |
| 2010/0142414 A1 | 6/2010 | Patel et al. |
| 2010/0190492 A1 | 7/2010 | Jiang |
| 2010/0234018 A1 | 9/2010 | Lawler et al. |
| 2011/0151917 A1 | 6/2011 | Mao et al. |
| 2011/0183659 A1 | 7/2011 | Ayyasamy et al. |
| 2011/0250923 A1 | 10/2011 | Miller et al. |
| 2013/0021965 A1 | 1/2013 | Chu et al. |
| 2013/0155875 A1 | 6/2013 | Ayyasamy et al. |
| 2013/0196706 A1 | 8/2013 | Patel et al. |
| 2013/0272436 A1 | 10/2013 | Makhlouf et al. |
| 2013/0337859 A1 | 12/2013 | Patel et al. |
| 2014/0078898 A1 | 3/2014 | Anchan et al. |
| 2014/0148210 A1 | 5/2014 | Kundu et al. |
| 2015/0078295 A1 | 3/2015 | Mandyam et al. |
| 2015/0092704 A1 | 4/2015 | Chen |
| 2016/0269945 A1 | 9/2016 | Jang et al. |

FOREIGN PATENT DOCUMENTS

| | | |
|---|---|---|
| WO | 0167674 A2 | 9/2001 |
| WO | 02101981 A1 | 12/2002 |
| WO | 03101007 A1 | 12/2003 |
| WO | 2005009006 A2 | 1/2005 |
| WO | 2005112494 A1 | 11/2005 |
| WO | 2005115032 A1 | 12/2005 |
| WO | 2005117474 A1 | 12/2005 |
| WO | 2006105287 A2 | 10/2006 |
| WO | 2010048217 A1 | 4/2010 |
| WO | 2010117815 A1 | 10/2010 |

OTHER PUBLICATIONS

Nokia: "What is TETRA? Why Nokia TETRA?", The Nokia TETRA Primer, 2002, pp. 1-29.

Skype: "Skype", Web Archive—Skype, May 22, 2004, pp. 1-2, May 22, 2004, pp. 1-2.

Trachwell: "TrackWell Software and Tetra Iceland deliver value added services to Tetra users", Trackwell.com, Oct. 2002, pp. 1-1.

* cited by examiner

PTX DATA ANALYTIC ENGINE NOTIFYING GROUP LIST OF DETECTED RISK EVENT

CROSS-REFERENCE TO RELATED APPLICATIONS

The present application claims benefit under 35 U.S.C. § 119(e) from U.S. Provisional Patent Application Ser. No. 62/429,013, filed Dec. 1, 2016, titled "Enhanced PTX Communication with Data Analytics Engine," the entire contents of which being incorporated herein by reference.

BACKGROUND OF THE INVENTION

Push-to-talk platforms involve providing PTT functionality (e.g., call group management, call origination, call transmittal, talk-back call termination, floor management, filtering, etc.) through PTT clients on client devices. The PTT functions may be performed by one or more servers, and communications between the client devices and the servers may be performed over a telecommunications network (e.g., a carrier network).

With the PTT service being internet protocol (IP) based, the PTT service is well suited to leverage multimedia support for video, multimedia messaging, virtual reality applications (e.g., gaming), etc. The future of PTT service may be the push-to-anything (PTX) service that enables user to send multimedia data in a united instant communication service set over a PTT network. Therefore, in the discussion hereinafter, PTT and PTX may be used interchangeably.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
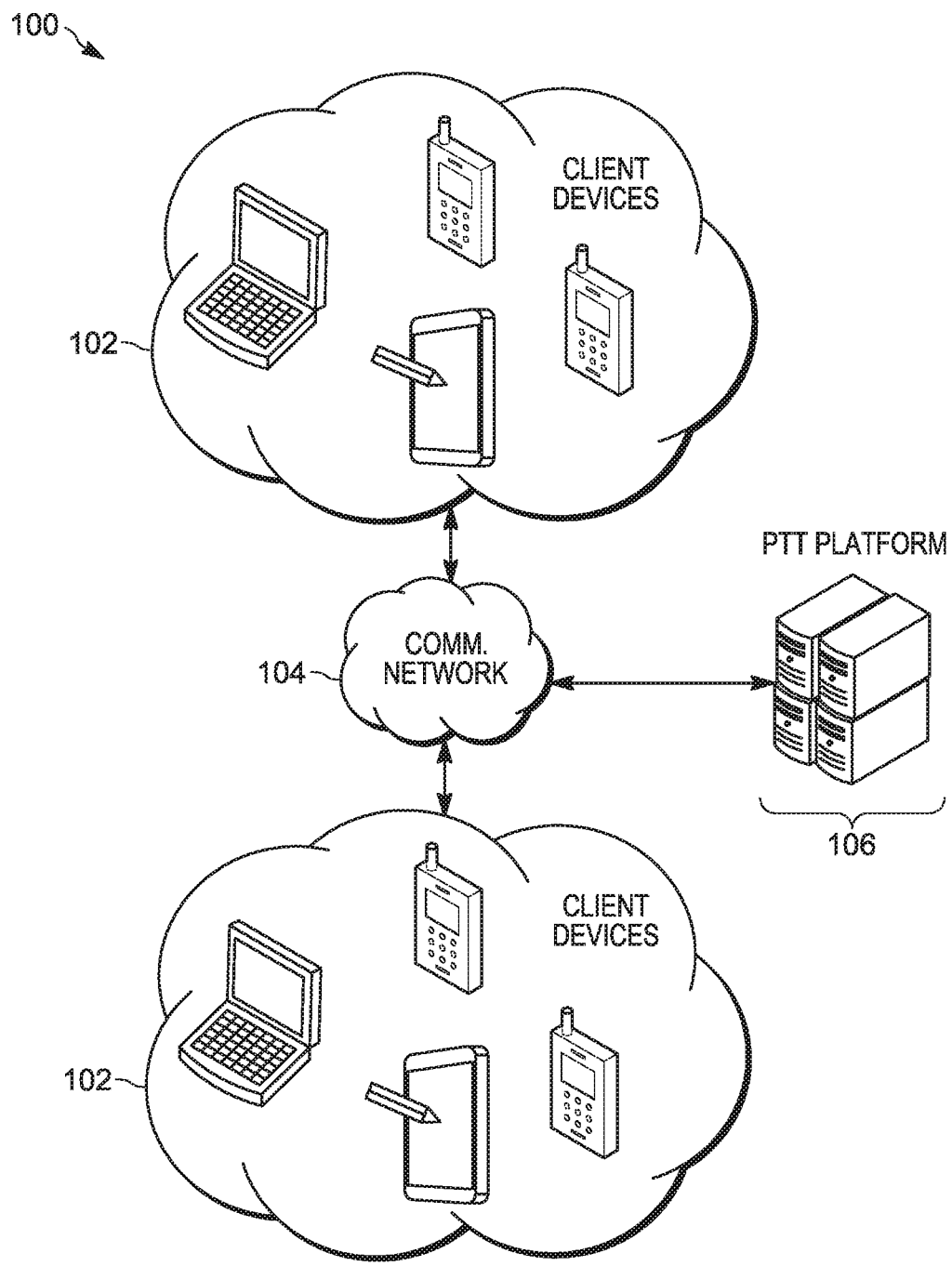
FIG. 1 illustrates a diagram of a communications network, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

A method of operating a push-to-anything (PTX) platform includes receiving, by a data analytics engine (DAE) of the push-to-anything platform, a first input signal from a first input source; calculating, by the DAE, a risk indicator using the first input signal, the risk indicator indicating a level of a security threat; detecting a risk event, by the DAE, when the risk indicator is above a first pre-determined risk threshold, the first pre-determined risk threshold corresponding to a pre-determine level of security threat above which an emergency response protocol is initiated; generating, by the DAE, a group list in response to detecting the risk event, where the group list comprises one or more client devices of the PTX platform; sending, by the DAE, the group list to a PTX server of the PTX platform; and notifying, by the PTX server, the one or more client devices in the group list of the risk event.

FIG. 1 illustrates a communications system 100, which provides an architecture for supporting a PTT communications solution in accordance with some embodiments. Communications system 100 includes client devices 102, a communications network 104, and a PTT platform 106. As used herein, the term "client device" refers to any component (or collection of components) capable of establishing a connection with a communications network, such as a user equipment (UE), a mobile station (STA), a cellular phone, a tablet, a laptop, and other wired/wirelessly enabled devices. Applications (referred to hereinafter as "PTT clients") reside on client devices 102 for accessing various PTT functions.

Client devices 102 may communicate with PTT platform 106 over network 104, which may be accessed by client devices 102 through a cellular network deployed by a carrier, a WiFi network, a radio access network (RAN), other wireless networks, a wired internet protocol (IP) network, combinations thereof, or the like. Network 104 may include one or more components configured to provide wireless or wired network access, such as an enhanced base station (eNB), a macro-cell, a femtocell, a Wi-Fi access point (AP), combinations thereof, or the like. Furthermore, network 104 may operate in accordance with one or more wireless communication protocols, e.g., open mobile alliance (OMA), long term evolution (LTE), LTE advanced (LTE-A), High Speed Packet Access (HSPA), Wi-Fi 802.11a/b/g/n/ac, etc. In some embodiments, network 104 may comprise various other devices, such as relays, low power nodes, etc. Network 104 may further include backhaul network components, such as various gateways, routers, controllers, schedulers, and the like.

In an embodiment where PTT platform 106 is a PTT-over-Cellular (PoC) platform, subscribers to a PTT solution (e.g., users operating client devices 102) may be provisioned onto communications system 100 via interfaces to carriers (e.g., cellular carriers). PTT customers (e.g., enterprises) can administer these subscribers to form closed groups for PTT communications. The PTT solution may interface with the carrier, for example, by including connectivity to the carrier's core network, billing interfaces, provisioning interfaces, lawful intercept interfaces, customer care interfaces, and the like. PTT platform 106 may provide a plurality of PTT functions to client devices 102 through the PTT clients on client devices 102 as described in greater detail below.

In some embodiments, PTT platform 106 uses container technology for virtualization of a PTT system architecture, such as, the virtualization of provided PTT services. Example container technologies may include Docker, Rocket, LXD, and the like although the architecture is not limited to a specific container technology. Virtualization using container technology may allow PTT platform 106 to adopt a micro-services model in which service clusters are considered the building blocks of the system architecture. For example, each function provided by PTT platform 106 may be virtualized in a unique service cluster, and each service cluster may perform a different function in PTT platform 106. Service clusters are hosted on virtual machines of an embodiment cloud network. An embodiment cloud network may include a plurality of geographically diverse deployment sites (e.g., data centers) where various virtual machines are physically deployed. Decomposition of the system into a set of services allows each service (e.g., each function provided by the PTT platform) to be independently deployed and managed. Thus, system resilience may be improved as failures are localized to individual services. Furthermore, rapid and agile deployment of services may also be achieved.

In some embodiments, PTT platform 106 incorporates distributed databases, clustering technologies, data analytics tools, and messaging middleware to provide a robust, scalable platform. PTT platform 106 may use fully virtualized components with a layered approach to service orchestration, which allows PTT platform 106 to be integrated into various cloud environments, such as a carrier's private cloud infrastructure, a dedicated PTT cloud infrastructure, combinations thereof, and the like. Other telecommunication services platforms, including other PTT platforms, may be used in other embodiments.

Figure 2:
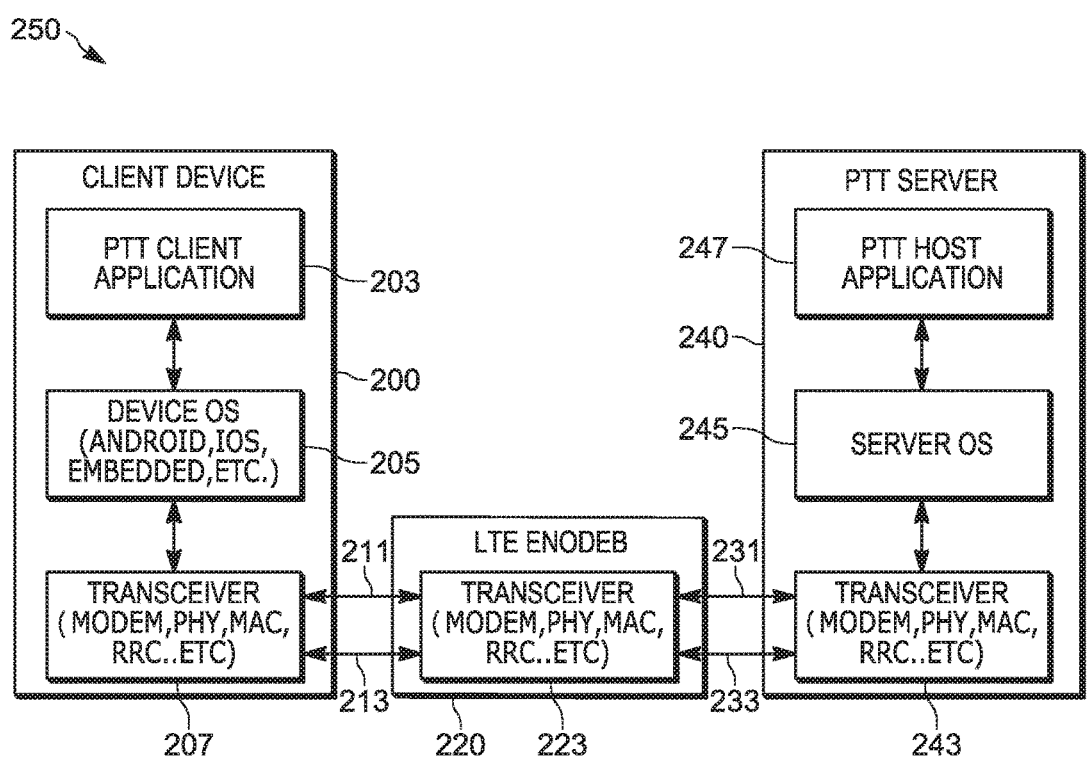
FIG. 2 illustrates a system diagram of a PTT system, in accordance with some embodiments.

FIG. 2 is a system diagram illustrating a PTT system 250 (may also be referred to as a PTT network, or a PTT platform), in accordance with some embodiments. PTT system 250 includes a client device 200 (e.g., an UE), an LTE eNodeB 220, and a PTT server 240 (may also be referred to as PTT network server). In the discussion below, the term "client device" may be used interchangeably with the term "UE." Each of UE 200, LTE eNodeB 220 and PTT server 240 has a transceiver (e.g., transceiver 207 for UE 200, transceiver 223 for LTE eNodeB 220, and transceiver 243 for PTT server 240) that is configured to transmit and receive data via the LTE air interface. Each of the transceivers (e.g., 207, 223, 243) includes hardware (e.g., modem, antennas) and the corresponding firmware/software that are configured to implement functionalities related to, e.g., the Physical (PhY) Layer, the Media Access (MAC) Layer, and the Radio Resource Control (RRC) layer of the LTE standard, in some embodiments. As illustrated in FIG. 2, data communication between UE 200 and PTT server 240 may go through LTE eNodeB 220 first, and LTE eNodeB 220 relays the data to the intended recipient (e.g., UE 200 or PTT server 240). Note that FIG. 2 illustrates a high level diagram of PTT system 250, and not all components of PTT system 250 are shown in FIG. 2.

UE 200 includes a transceiver 207, an Operating System (OS) 205 (e.g., Android, iOS, or an embedded OS), and a PTT client application 203. Transceiver 207 supports communication with LTE eNodeB 220 through bi-directional data link 213 (e.g., a wireless data link) for transmitting uplink data and receiving downlink data. In addition, control signals are exchanged between transceiver 207 and LTE eNodeB 220 via bi-direction control signal link 211. The OS 205 transmits packets to and receives packets from PTT client application module 203, e.g., Universal Datagram Protocol (UDP) packets, Transfer Control Protocol (TCP) packets, Stream Transmission Control Protocol (SCTP) packets, or the like. PTT client application module 203 may be a software application running on OS 205 of UE 200. Packets, such as RTP packets and/or Internet protocol (IP) packets are communicated between UE 200 and LTE eNodeB 220, and the packets are then communicated between LTE eNodeB 220 and PTT server 240, in the illustrated embodiment.

In some embodiments, PTT server 240 includes a transceiver 243, a Sever OS 245, and a PTT host application 247. Transceiver 243 supports communication with LTE eNodeB 220 through bi-directional data link 233 and bi-direction control signal link 231. The Sever OS 245 transmits to and receives from PTT host application module 247 packets, e.g., Universal Datagram Protocol (UDP) packets, Transfer Control Protocol (TCP) packets, Stream Transmission Control Protocol (SCTP) packets, or the like. PTT host application module 247 may be a software application running on Server OS 245, or may include dedicated hardware with software/firmware running on the dedicated hardware. Packets, such as RTP packets and/or Internet protocol (IP) packets are communicated between PTT server 240 and LTE eNodeB 220, and the packets are then communicated between LTE eNodeB 220 and client device 200, in some embodiments.

FIG. 2 illustrates one UE 200, one LTE eNodeB 220, and one PTT server 240. However, other numbers of UE, LET eNodeB, or PTT server could also be used. Although FIG. 2 uses an LTE cellular network as an example, any type of suitable network (e.g., other cellular network, or other non-cellular network such as Wi-Fi), currently existing or to be deployed in the future, may also be used and are fully intended to be included within the scope of the present disclosure. In addition, the system diagram illustrated in FIG. 2 is merely a non-limiting example, and other system architectures for the PTT system 250 are possible and are fully intended to be included within the scope of the present disclosure.

Figure 3:
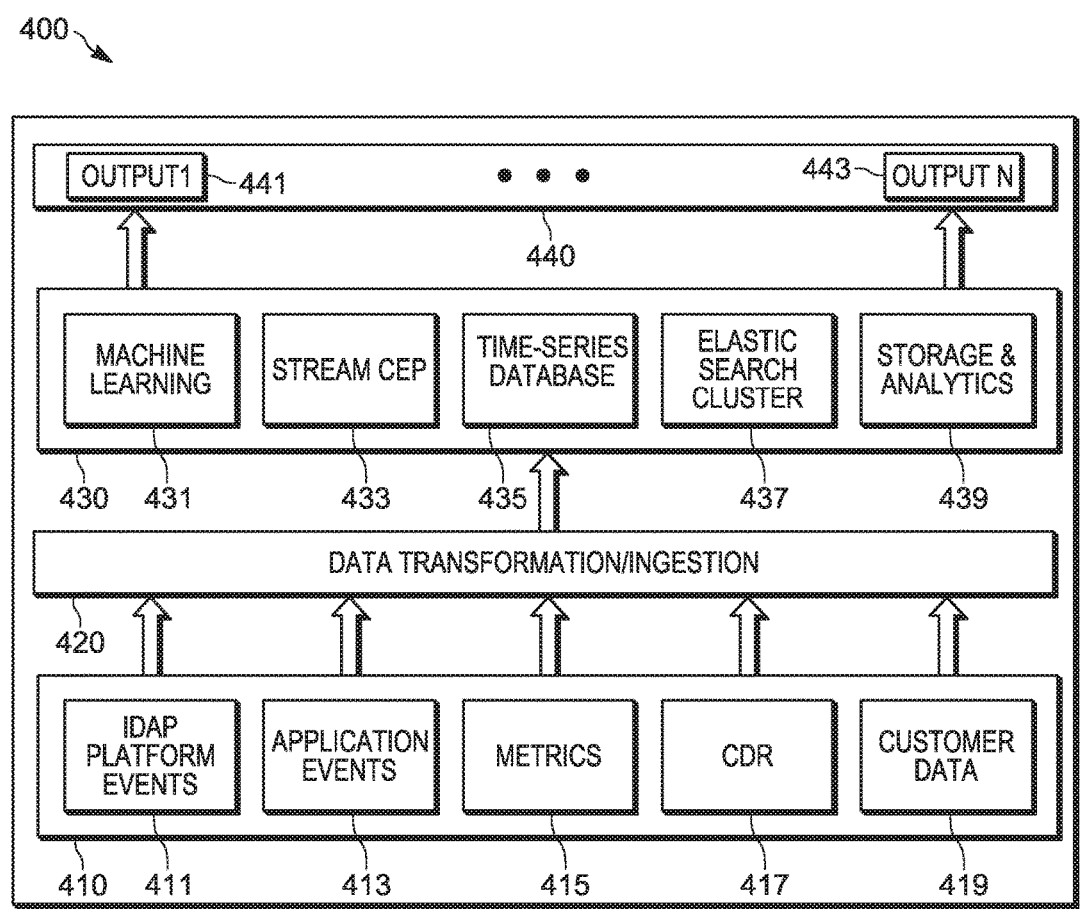
FIG. 3 illustrates a block diagram of a data analytics engine (DAE), in accordance with some embodiments.

FIG. 3 illustrates a block diagram of a data analytics engine (DAE) 400, in some embodiments. The DAE 400 is deployed in the PTT platform 106 of FIG. 1, in some embodiments. PTX platforms augmented with the DAE 400 may provide enhanced functionalities in public safety and public service. The DAE 400 may provide these enhanced functionalities by, e.g., application interfaces (APIs) that can be used to interact with other modules of the PTX system and/or external input sources. In the discussion herein, the DAE 400 may also be referred to as an integrated data analytics platform (IDAP). A high-level overview of the DAE 400 is provided hereinafter first, before details of the various functional modules of the DAE 400 in FIG. 3 are discussed.

In some embodiments, a DAE-enhanced PTX system receives an input signal from an input source, and processes the received input signal using the DAE 400. The input source may be a client device, a sensor connected to the DAE 400, other network or database connected to the DAE 400, or the like. Examples of the input source include internet-of-things (IOT) devices, sensors (e.g., audio sensor, image/video sensor) on a drone deployed to a surveillance area, social media, county records, or other sensors/input sources. The data (e.g., input signal) from the input source may be transferred to the DAE 400 via, e.g., the wireless communication channels of the PTX system, or via any other suitable data channel (e.g., wireline connection to a server hosting the county record). The DAE 400 processes the collected data using suitable rules and algorithms, such as machine learning (ML), artificial intelligence (AI), pattern recognition, combinations thereof, or the like, and the DAE 400 provides analytics of the collected data as output, in some embodiments. In some embodiments, the DAE 400 provides real-time analytics of the collected data.

The analytics of the collected data may include calculating a risk indicator indicating a level of a security threat, where the security threat may refer to a threat to, e.g., public safety, or a life threat. For example, the risk indicator may indicate the likelihood of a fire breaking out, may indicate the likelihood that a remaining amount of air supply (e.g., oxygen) in a tank of a self-contained breathing apparatus (SCBA) used by a response personnel (e.g., a firefighter) is approaching an unacceptable level (e.g., below a pre-determined level), combinations thereof, or the like. The risk indicator may be calculated using the input signal (e.g., temperature data from a temperature sensor, smoke data from a smoke sensor, carbon monoxide data from a carbon monoxide sensor, pressure data from a tank pressure sensor, or the like) and a pre-determined value corresponding to the type of the input signal being evaluated (e.g., a pre-determined temperature value, smoke level, carbon monoxide level, or the like indicating a fire breakout, a pre-determined pressure value indicating a dangerously low level of air supply in the tank, or the like). In some embodiments, the pre-determined value may be obtained, e.g., using a historical data relating to the type of input signal being evaluated. The pre-determined value may be pre-configured or learned (e.g., using machine learning) based on, e.g., prior knowledge, safety guide lines, or city code specific to the customer and/or location being monitored. In some embodiments, the DAE 400 (e.g., the algorithms used by the DAE and/or the parameters of the algorithms, such as the pre-determined value) is reconfigurable, and the DAE 400 determines the risk indicator based on one or more input signals dynamically. In embodiments where the input data (e.g., a video stream) is processed by an algorithm (e.g., pattern recognition and/or pattern matching algorithm) to detect one or more features of interest (e.g., a weapon), the algorithm may provide a confidence level (e.g., a percentage value) indicating the probability that the one or more features of interest is detected. In some embodiments, using the input data and a historical data, the DAE 400 makes prediction of an outcome at a future time and provides a confidence level that the predicted outcome will happen. In some embodiments, the confidence level is used as or converted into the risk indicator.

In some embodiments, the DAE 400 detects a risk event, such as a fire breaking out, by comparing the risk indicator with a pre-determined risk threshold, where the pre-determined risk threshold corresponds to a pre-determined level of security threat above which an emergency response protocol is initiated. For example, when the DAE 400 detects that the risk indicator is above the pre-determined risk threshold, the DAE 400 determines that a risk event is detected. The emergency response protocol may include notifying relevant first responders (e.g., firefighters, police, hospital emergency staff) of the risk event. The emergency response protocol may include addition procedures such as deploying a drone with on-board sensors to the location of the risk event to obtain real-time footage of the risk event and relaying the real-time footage to first responders.

In some embodiments, the DAE 400 calculates the risk indicator using two or more input signals. In some embodiments, the two or more input signals are signals from multiple sensors of the same type. For example, for fire detection, a plurality of temperature sensors may be used to provide multiple measurements of temperature at various locations within an area being monitored to provide improved monitoring coverage. The multiple sensors of the same type may also provide redundancy against individual sensor failure.

In some embodiments, the two or more input signals are signals from multiple sensors of different types. For example, for fire detection, the DAE 400 may collect input signals from different types of sensors (e.g., temperature sensor(s), smoke sensor(s), light sensor(s), carbon-monoxide (CO) sensor(s), or the like). Using sensors of different types may increase the reliability of the detection of the risk event, due to the diversity of the attributes measured by the different types of sensors. In yet other embodiments, the two or more input signals may include input signals from multiple sensors, some of which are of a same type, and some of which are of different types. These and other variations are fully intended to be included within the scope of the present disclosure.

In some embodiments, the DAE 400 computes a risk indicator for each input signal. In some embodiments, the DAE 400 may use a single input signal to compute the risk indicator, in other embodiments, the DAE 400 may compute the risk indicator from a plurality of input signals. For example, an individual risk indicator may be calculated for each of the plurality of signals, and the individual risk indicators may be combined to calculate the risk indicator (also referred to as a combined risk indicator). Different rules for combining the individual risk indicators may be used, such as a weighted sum rule where each individual risk indicator is assigned a specified weight factor. The risk indicator is then used to compare with the pre-determined risk threshold to detect the risk event. In some embodiments, the DAE 400 computes a risk indicator for each input signal and makes a temporary decision about whether a risk event is detected or not for each input signal, then all the temporary decisions are combined to decide whether a risk event is detected or not. Different rules for combining the temporary decisions may be used. For example, a "majority rule" may be used where the majority of temporary decisions are used as the final decision for detection of the risk event. In such embodiment using the "majority rule," a risk event is detected when a majority of the temporary decisions detect a risk event, and the risk event is not detected when a majority of the temporary decisions do not detect the risk event.

In addition to detecting a risk event that is happening or just happened, the DAE 400 may also detect a potential risk event at a future time (e.g., hours, days, or weeks in the future). In some embodiments, the DAE 400 calculates a predicted risk indicator that indicates a level of security threat at a future time. The DAE 400 may use an input signal and a historical data base of the input signal to calculate the predicted risk indicator. Big data analytics, artificial intelligence, machine learning, or other algorithms may be used to calculate the predicted risk indicator. The DAE 400 detects a potential risk event by comparing the predicted risk indicator and a pre-determined risk threshold, where the pre-determined risk threshold corresponds to a pre-determine level of security threat above which risk management resources are deployed. The risk management resources may be deployed to prevent the potential risk event from happening, to reduce the likelihood of the potential risk event happening, or to provide quicker response when the potential risk event actually happens.

As an example, consider the case where the DAE 400 calculates a predicted risk indicator for a potential risk event (e.g., traffic accidents) at a particular location (e.g., a section of a highway) at a future time (e.g., three hours from now, days from now, or weeks from now) based on a real-time input signal (e.g., measured traffic volume) and historical record of the input signal. The DAE 400 may use any suitable algorithm, such as a triple exponential smoothing algorithm (e.g., the Holt-Winters triple smoothing algorithm) to predict an input signal (e.g., traffic volume) at the future time. Historical data (e.g., traffic accidents records) regarding the risk event may be used to establish a relation between the input signal (e.g., traffic volume) and the risk indicator (e.g., likelihood of traffic accidents happening), and the DAE 400 may then calculate a predicted risk indicator at the future time using the predicted input signal at the future time. If the predicted risk indicator is above a pre-determined threshold, the DAE 400 detects a potential risk event. In response, risk management resources, such as traffic warning signs, police patrol cars, and/or ambulances may be deployed to the particular location in anticipation of the risk event.

Once a risk event or a potential risk event is detected, the DAE 400 dynamically generates a group list which includes one or more client devices of the PTX system, in some embodiments. Details regarding the generation of the group list are discussed hereinafter with reference to FIG. 4. The PTX system then notifies the one or more client devices in the group list of the risk event (or the potential risk event). The PTX system may notify the one or more client devices in the group list via text, email, voice call, audio/video message, or any other suitable format. In addition, the DAE 400 may take additional procedures such as deploying a drone to the location of the risk event and to receive real-time information (e.g., real-time audio, real-time video) provided by the sensors on the drone through data links of the PTX system. The DAE 400 may relay the real-time information of the drone to emergency response personnel via the data links of the PTX system. In some embodiments, the DAE 400 process the input signal(s) to produce processed data, and the processed data is dispatched to various outlets such as consoles, handheld devices, and social media.

In some embodiments, the DAE 400 has a feedback loop for improving the algorithms of the DAE 400 for better predicting/estimating future outcome (e.g., input signal such as traffic volume at a future time). For example, the outcome (e.g., the traffic volume) measured/observed at the predicted time is feedback to the DAE's algorithm modules (e.g., a machine learning module) for self-learning and for improving the accuracy of the algorithms Models, parameters of the models, and/or the pre-determined threshold used for detecting the risk event or the potential risk event may be updated using the measured/observed outcome, such that the accuracy for future prediction is improved. The updated algorithm is then used for predicting new outcomes, and the measured/observed values of the new outcome are feedback to the DAE 400 again for another round of self-learning and improvement.

Details of the embodiment DAE 400 in FIG. 3 are now discussed. As illustrated in FIG. 3, the DAE 400 comprises a peripheral module 410, a data transformation/ingestion module 420, a data processing module 430, and an output interface 440. The peripheral module 410 performs system maintenance tasks and provides an interface for the DAE 400 to interact with other modules outside the DAE 400. In the illustrated example, the peripheral module 410 includes an IDAP platform events module 411, an application events module 413, a metrics module 415, a call data record (CDR) module 417, and a customer data module 419.

The IDAP platform events module 411 may perform functionalities related with IDAP self-checking and IDAP health monitoring. For example, the IDAP platform events module 411 may periodically generate IDAP self-diagnostic requests, or may accept external requests for checking the health (e.g., system integrity) of the IDAP. The application events module 413 may be used to interact with other PTX system modules or input sources. For example, a new input signal from a sensor of an IOT device may arrive at the application events module 413 and trigger a new event through the application events module 413, and the new event will trigger the data processing module 430 to process the new data (e.g., the new input signal). The metrics module 415 may be used to collect status of the various input sources, e.g., IOT devices, and may be used to monitor the health of the various input sources. Defective input sources (e.g., malfunctioning IOT devices), once identified, are reported to the IDAP, such that proper actions can be taken. For example, maintenance crew may be notified to repair/replace the defective devices, and input signals from these defective input sources are processed accordingly (e.g., discarded) before defective devices are repaired or replaced. The CDR module 417 may provide details regarding incoming calls (e.g., PTX calls, or input signals from various input sources such as IOT devices, video feeds from sensors, or the like), such as the type of calls, the details of the calls (e.g., length of the call, who initiated the call), and the nature of the call (e.g., text, video). The customer data module 419 provides the customer's data (e.g., PTX service subscribers' data). For example, for a customer (e.g., a company) who subscribes to security monitoring service, the customer data module 419 may store or retrieve customer data such as the number and the type of monitoring sensors of the customer, the type of service of the customer, the supervisors' names and the reporting hierarchy of the company (e.g., for sending alerts), or the like.

As illustrated in FIG. 3, the input signals from various input sources, after being received at the peripheral module 410 (e.g., by the application events module 413), are processed by the data transformation/ingestion module 420, before being sent to the data processing module 430. The input signals from various input sources may have drastically different formats. The data transformation/ingestion module 420 reformats the input signals, and transforms the input signals into a uniform data format, such that the data processing module 430 is presented with a homogeneous input data format regardless of the input sources, in some embodiments.

As illustrated in FIG. 3, the date processing module comprises a machine learning module 431, a stream complex event processing module 433, a time-series database 435, an elastic search cluster 437, and a storage and analytics module 439. In some embodiments, the machine learning module 431 uses an input signal and a historical data base of the input signal to generate analytics of the input signal, where the analytics may include a risk indicator at the current time, or a predicted risk indicator at a future time. Suitable algorithms and techniques for estimating and/or predicating a future outcome (e.g., the input signals at a future time, the risk indicator at a future time), such as big data analytics tools, neural networks, pattern recognition, pattern matching, or triple exponential smoothing algorithm (e.g., the Holt-Winters triple exponential smoothing algorithm), may be used to obtain the predicated values for a future outcome. In some embodiments, the machine learning module 431 has a feedback loop for feeding back the measured values of the outcome at the predicted time to the machine learning module 431. By comparing the predicted values of the outcome at a specific time with the actual measured values of the outcome at the specific time, the machine learning module 431 may adjust the model and/or the parameters of the model used in predicting the outcome, thereby improving the accuracy of the prediction. The analytics of the input signal produced by the machine learning module 431 may include detection of a risk event (or a potential risk event at a future time), the machine learning module 431 may use the feedback loop to improve the model used for prediction to achieve better probability of detection while reducing the false alarm rate.

In some embodiments, the stream CEP module 433 monitors (e.g., continuously monitors) a streaming data (e.g., a video stream, an audio stream) to detect a risk event. For example, by continuously monitoring input signal (e.g., audio stream) from an audio sensor, the stream CEP module 433 may detect a gunshot from the ambient noise. Similarly, by continuously monitoring a video stream, the stream CEP module 433 may detect an intruder crossing a border of a secure area.

In some embodiments, the time-series database 435 interprets collected data from multiple input sources (e.g., different sensors) to calculate a risk indicator and/or to detect a risk event. The data (e.g., input signals) from the multiple input sources may be discrete data samples taken at discrete time slots. As an example, consider fire detection by the DAE 400 using multiple sensors, e.g., temperature sensor, smoke sensor, light sensor, and/or CO sensor. Each sensor may periodically send a measured data to the DAE 400. By combing data across multiple APIs (e.g., data from different sensors), the time-series database 435 compares the outcomes (e.g., risk indicators, predicted risk indicators, risk events detection, or potential risk events detection) generated using data from multiple input sources, and identifies a correlation or certain degrees of consistency among the outcomes, and uses the identified correlation or consistency to form a final outcome.

In some embodiments, when a new data sample is received, the time-series database 435 updates the risk indicator using the new data sample. In some embodiments, the historical record of the data is used with the new data sample to provide a smoothed (e.g., using an exponential smoothing algorithm such as triple exponential smoothing algorithm) version of the input data, e.g., to reduce the impact of a data sample having abnormal amount of random noise. The risk indicator may then be calculated using the received input data, or a smoothed version thereof. In some embodiments, computation of the risk indicator takes into consideration various factors such as a historical record of the input data, the time when the input data was sampled, and the season when the input data was sampled. In the example of fire detection, the risk indicator is calculated by comparing the input data (e.g., a measured ambient temperature) with a pre-determined temperature value that indicates a fire breakout, and the pre-determined temperature value may be determined based on the history of the ambient temperature and adjusted to take into consideration of factors such as the time (e.g., afternoon vs. night time) and the season (e.g., winter vs. summer) when the input data is measured. When the calculated risk indicator is larger than a pre-determined risk threshold, which may indicate a high probability (e.g., larger than 85%) of a risk event (e.g., fire breakout), the DAE (e.g., the time-series database 435 of the DAE) declares that the risk event is detected. In embodiments where input data from multiple input sources (e.g., temperature sensors, smoke sensors, light sensors, and CO sensors) are used to detect a risk event, each sensor's data may be used to produce a respective risk indicator and/or a respective temporary risk event detection decision, and the risk indicators and/or the temporary risk event detection decisions from multiple sensors are analyzed and combined by the time-series database 435 to form a final risk indicator and/or to form a final decision regarding detection of the risk event. Rules (e.g., the weighted sum rule, the majority rule) for combining risk indicators and/or the temporary risk event detection decisions are discussed previously and not repeated here.

The elastic search cluster 437 is an internal search engine that provides APIs to other functional modules of the DAE 400 and other applications in the PTX system, in some embodiments. The elastic search cluster 437 may search, e.g., historical data bases stored in the storage and analytics module 439 and may return the search results to the other functional modules (e.g., 431, 433, 435) of the DAE 400. The search results may be used in calculating the risk indicator and in detecting the risk event. The storage and analytics module 439 may hold historical data bases for various data (e.g., input signals, predicted outcome). The storage and analytics module 439 may also perform off-line data analysis using data mining, big data analytics tools, or the like, and may store the results of the date analysis for use by the DAE 400.

Still referring to FIG. 3, the DAE 400 has an output interface 440, which may include a plurality of output modules such as 441 and 443. The output of the DAE 400 may have different formats intended for different usage. For example, the output of the DAE 400 may be processed data (e.g., analytics including risk indicators, detection of risk events), a report for operational dashboards or business dashboards, ad-hoc search and queries, or machine learning or AI models, as example. The output interface 440 sends the output of the DAE 400 to various outlets via the output interface 440. Examples of the outlets include consoles, handheld devices, and social media. As another example of the actions the DAE 400 may take in response to a detected risk event, the DAE 400 may dispatch a drone to a location of a detected risk event and may relay the sensor data from the drone to first responders.

Figure 4:
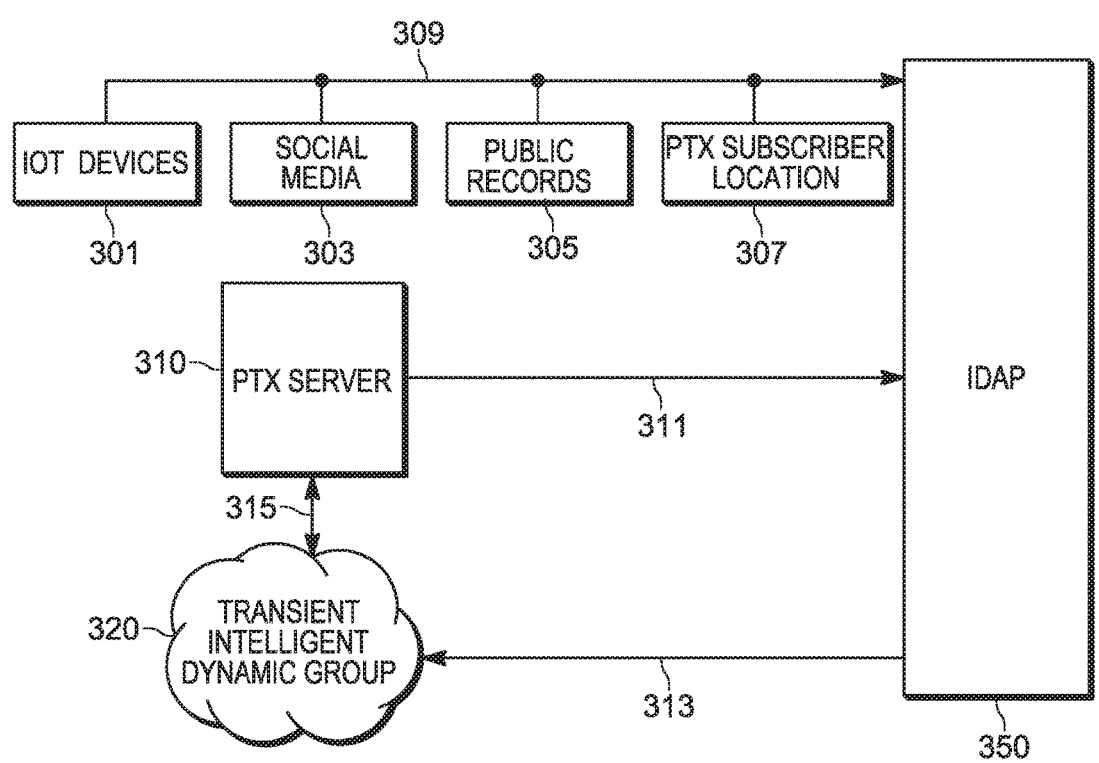
FIG. 4 illustrates a functional diagram illustrating the interactions between DAE and various other functional modules, in accordance with some embodiments.

FIG. 4 illustrates a functional diagram of a PTX system comprising a PTX server 310 and an integrated data analytics platform (IDAP) 350, in some embodiments. In the description herein, IDAP platform is used interchangeably with DAE, and therefore, the IDAP 350 in FIG. 4 is the DAE 400 in FIG. 3, in the illustrated embodiments. FIG. 4 further illustrates the interaction between IDAP 350 and PTX server 310 as well as various input sources (e.g., 301, 303, 305, and 307), in some embodiments. Although the IDAP 350 is illustrated in FIG. 4 as a separate functional module from the PTX server 310, the IDAP 350 may be implemented as a software application running on the PTX server 310.

As illustrated in FIG. 4, the IDAP 350 receives data from multiple input sources, such as IOT devices 301, social media 303, public records (e.g., county records) 305, and PTX subscriber location 307. Once a risk event or a potential risk event is detected, the IDAP 350 generates a dynamic group list 320, which dynamic group list 320 includes one or more client devices (e.g., client devices of first responders) of the PTX system. Note that the dynamic group list is not a pre-determined group list, instead, the dynamic group list is created intelligently on the fly by the IDAP 350 in response to the risk event. Factors used by the IDAP to create the dynamic group list include, e.g., location of the risk event, time of the day of the risk event, incident type (e.g., fire breakout, traffic accident, gunshot detected), shift schedule of emergency responders, and available resources (e.g., available personnel and available equipment such as drones, ambulances, helicopters). For example, based on the incident type, the IDAP may choose the types of first responders to include in the dynamic group list, e.g., police officers, emergency medical technicians (EMTs), firefighters, hospital emergency staffs, combinations thereof, or the like. The location of the risk event may be used to determine the nearest or the nearby first responders to be included in the dynamic group list. The time of the risk event and the shift schedule of the first responders may be used to include first responders that are on duty at the time of the risk event. The available resources may also be used to determine the dynamically list. For example, if a city police department is equipped with surveillance drones, the dynamical group list may include drones to be deployed to the location of the risk event. In some embodiments, the IDAP 350 obtains currently registered PTX users on the PTX system from the PTX server 310, and intelligently forms the dynamic group list 320 by choosing from the currently registered PTX users based on factors such as those discussed above.

Once the dynamic group list 320 is formed, it is sent from the IDAP 350 to the PTX server 310, and the PTX server 310 notifies the client devices in the dynamic group list 320 of the risk event. Once formed, the dynamic group list 320 remains dynamic, which means that the dynamic group list 320 may be updated as the risk event unfolds. For example, in response to a fire breakout detected at an empty warehouse using data from IOT sensors, the dynamic group list 320 may initially include fire fighters. As the IDAP 350 obtains new input data (e.g., from fire fighters on the ground, social media, or news reports) indicating that injuries due to the fire were reported, the dynamic group list 320 may be updated to include EMTs and emergency room staff at a nearby hospital. Conversely, as the risk event unfolds, certain first responders may be removed from the dynamic group list 320 since they may not be needed in the emergency response effort. In addition to or in lieu of the IDAP 350, the PTX server 310 may also add or remove client devices to the dynamic group list 320. In some embodiments, IDAP 350 sends alert, notification, real-time analytics, real-time or near real-time data stream (e.g., video or audio stream) to the client devices in the dynamic group list 320.

In some embodiments, the IDAP 350 provides real-time analytics and intelligence based on historical and real-time data gathered such as location information of PTX subscribers, time series data from IOT devices, on demand data request from social media and public records sources, combinations thereof, or the like. The IDAP 350 also provides real-time video processing and pattern matching. Using machine learning, IDAP can model outcomes regarding how the dynamic groups list should be formed. Triple smoothing algorithm (e.g., Holt-Winters triple smoothing algorithm) is used for time-series data from IOT devices to check for any deviations from predicted future data points and provide appropriate thresholds.

Various embodiment applications of the DAE-enhanced PTX system (also referred to as DAE-enhanced PTX platform) are described hereinafter. In the various embodiments, data from one or more input sources (e.g., sensors) are sent to the DAE 400 of the PTX system. The DAE 400 processes the received data and generates analytics of the input signal, which analytics may include risk indicators and detection of risk events. Once a risk event or a potential risk event is detected by the DAE 400, the DAE 400 generates a dynamic group list and notifies client devices in the group list of the risk event (or potential risk event). Besides emergency responders, the dynamic group list may include a drone to be deployed. Additional procedures taken by the DAE 400 may include analyzing the sensor information (e.g., image, audio/video footage) collected by the deployed drone, relaying the sensor information of the deployed drone and relaying the processed sensor information (e.g., detection of weapon on suspect) to the emergency responders. For simplicity, the sensors and the DAE processing may be not explicitly described below. One of ordinary skill in the art, upon reading the description below, will readily identify the sensor(s) and the DAE processing as describe above. In addition, these embodiments are merely examples and not intended to be limiting. Other modifications and other applications using the DAE-enhanced PTX system are possible and are fully intended to be included within the scope of the present disclosure.

In an embodiment, the DAE-enhanced PTX platform is used for suspect scanning in law enforcement. For example, the dash cam of a police patrol car may send the live feed of the dash cam to a DAE-enhanced PTX platform, which analyzes the data in real-time and launches a remote-controlled drone with onboard loud speaker, camera, infrared (IR) and/or thermal imaging capabilities, as examples. The drone may scan the license plate of the suspect vehicle, the driver's license or any other documents (e.g., proof of disability) of the suspect, and/or uses thermal imaging and IR imaging to scan for any potential weapons. The DAE-enhanced PTX platform may send the real-time analytics to the police patrol car, and the police officer may then proceed accordingly with the analytics provided by the DAE 400.

In another embodiment, the DAE-enhanced PTX system is used for smart firefighting. Sensors (e.g., fire sensors, smoke sensors, light sensors, CO sensors) are installed in various buildings and at various locations to monitor and to send data to the DAE-enhanced PTX system. When the DAE-enhanced PTX system detects fire and the fire's location (e.g., using data from the sensors), the DAE-enhanced PTX system launches a nearby available drone to the location of the incident. Drones equipped with IR cameras may conduct aerial surveillance during all of the four stages (e.g., before arriving to the fire ground, before entering the fire ground, while on the fire ground, and after leaving the fire ground) of firefighting, thus providing crucial information throughout all stages of firefighting. As a particular example, consider the case where a fire incident occurs at a location monitored by sensors (e.g., fire sensors, smoke sensors, and/or temperature sensors). The sensors collect data periodically, record anomalies such as temperature spike, presence of smoke, changes in carbon monoxide (CO) levels, combinations thereof, or the like. This data is sent through secure connection to an analytics server (e.g., DAE 400 of a DAE-enhanced PTX system) that has been preconfigured with various thresholds (e.g., temperature threshold, smoke threshold, fire threshold) based on historical data. The analytics server (e.g., DAE 400) forwards the relevant information to the Tactical Dispatch software. The Tactical Dispatch software receives the alerts and has options to send out alert to relevant recipients (e.g., police, fire stations in a dynamic group list) via the PTX system. The alert may be in the format of video, images, alerting, calls, or the like. The Tactical Dispatch may also be capable to launch a drone having IR and thermal imaging capabilities, as well as the capability to send live feed that is dynamically configurable, thereby improving the situational awareness and providing the ability to see beyond traditional visual line of control.

In some embodiments, the DAE-enhanced PTX platform is used for predictive and/or proactive policing (may also be referred to as intelligent policing). For example, based on various input data, the DAE 400 analyzes and highlights incidences based on, e.g., crime type, crime location and time of crime. The DAE 400 may have a feedback loop to enhance the data for future predictions. In some embodiments, the DAE-enhanced PTX system gathers data from sources such as open data, municipal service providers, local events listing websites, price discounts information at local pubs. In some embodiments, the DAE 400 analyzes the data and generates rules which are used for crime deterrent planning, such as placement of police patrol cars in certain areas based on the analytics, or enhanced vigilance in predicated crime-prone areas.

In some embodiments, the DAE-enhanced PTX platform is used for coordination for narcotics or manhunt operations. For example, drones may be deployed for a visual scanning in a forest area, and information from the drones (e.g., video/image/sound) can be shared among law enforcement for better coordination via the DAE-enhanced PTX platform. The DAE-enhanced PTX platform may be involved in various aspects of operation, such as: live location sharing; peer-to-peer awareness of drones and assets (e.g., Proximity Lists listing assets that are nearby and could be reached by police officers, estimated time en-route (ETE)); live data feeds sent to PTX platform; time stamping and geo-tagging of data (e.g., for use as evidence); incident notebook (recording all information for after action reports (AARs)). In some embodiments, augment radio communication using instant communications are achieved using the DAE-enhanced PTX platform.

In some embodiments, the DAE-enhanced PTX platform is used for mobile gunshot detection and deployment of law enforcement. As a particular example, consider the case where gun shots have been fired in an area. Mobile equipment equipped with sensitive omni-directional microphones that are capable of detecting gunshots and direction of gun shots activate the various surveillance devices in the vicinity: body cams, dash cams, drones, the like, or combinations thereof. In an embodiment, Incident Management Application Interfaces (APIs) may be used to create situational aware groups for communications using the DAE-enhanced PTX platform.

In some embodiments, the DAE-enhanced PTX platform is used for public safety, e.g., smart routing for firefighters or oxygen tank monitoring for firefighters. For example, fire hydrants equipped with sensors are connected (e.g., wirelessly or through wire-line) to the DAE-enhanced PTX platform. When the DAE-enhanced PTX system detects fire and its location (e.g., using data from the sensors), the DAE-enhanced PTX system evaluates fire hydrant positions near the incident, analyzes traffic condition (e.g., using information from Google/Waze traffic, video analytics of streets), and sends optimum route information to fire engines. The optimized routes for fire engines are calculated by the PTX platform, in some embodiments.

As another example, consider the case where fire incident has resulted in firefighters being deployed to scene. The Self Contained Breathing Apparatus (SCBA's) (e.g., oxygen tanks) of the firefighters are equipped with sensors for monitoring the amount of air (e.g., oxygen) remaining in the SCBAs, ambient pressure, tank temperature, and the like. The DAE-enhanced PTX system constantly keeps track of the metrics associated with the SCBA and generates emergency alert, which may be sent over DAE-enhanced PTX platform to keep the fire fighters safe, in some embodiments.

In some embodiments, the DAE-enhanced PTX platform is used for monitoring connected bodysuits and armor (e.g., worn by police officers) that are equipped with sensors. The sensors may be used for monitoring various medical signals. Examples of the medical signals include vitals such as breathing rate (e.g., via chest-worn respiration belt), heart rate, muscle activity, blood oxygen levels; movements measured by accelerometers; EEG and ECG signals. In some embodiments, the DAE 400 compares a measured signal (e.g., heart rate) with a pre-determined range (e.g., a normal heart rate range) for the measured signal to compute the risk indicator. In addition, the DAE-enhanced PTX platform may also monitor live HD video feed from body cam; perform automatic life threatening vitals assessment; and/or perform real-time threat assessment with location detected via GPS. The DAE-enhanced PTX platform may also use the missing of regular poll of the sensor as a trigger to detect a risk event, such that alert may be sent to client devices of other security personnel to check on the wearer of the connected bodysuits and armor. In some embodiments, the DAE-enhanced PTX platform is used for armor monitoring. Sensors of the armor may communicate with the DAE 400 to detect the gun's orientation, whether the gun is out of holster, and the pressure exerted to the gun (e.g., by the palm of the user of the gun). The information from the sensors is sent live to the analytics server (e.g., DAE 400) of the DAE-enhanced PTX platform.

In some embodiments, the DAE-enhanced PTX platform is used in a real-time crime center. Real time analytics of a crime is analyzed by the PTX platform's analytics server (e.g., DAE 400). Based on the DAE's analysis, further actions (e.g., creating tailored alerts) are created for various subscribed channels. For example, alerts of potential risks are sent directly to citizens and organizations such as university/schools, businesses (e.g., day care centers), assisted living centers, ordinary citizens via social feeds (e.g., dynamic hashtag generation), and social media outlets.

In some embodiments, the DAE-enhanced PTX platform is used for emergency medical service. For example, the DAE-enhanced PTX system, based on the location of the medical emergency, identifies the nearby emergency center available for emergency responders. The DAE-enhanced PTX system may also transmit the received patient information to, e.g., the identified emergency center.

In some embodiments, the DAE-enhanced PTX platform is used in cardiac arrest response. For example, when 911 call for assistance with Sudden Cardiac Arrest (SCA) is received, the SCA event is relayed as alert (along with the information of the location and other details) to various channels subscribed for CPR trained volunteers that are nearby and capable of applying the lifesaving CPR until EMS team arrives. The volunteers may belong to a location aware CPR trained volunteers ad-hoc group. For example, the DAE 400 may generate a dynamic group list of CPR trained volunteers based on the location of the SCA event and locations of CPR trained volunteers current registered in the PTX system, and the alert may be sent to client devices in the dynamic group list. Various functions performed by the DAE-enhanced PTX platform may include identifying location aware artificial external defibrillators (AEDs), auto dispatching of alerts, and broadcast of information via the DAE-enhanced PTX system.

Figure 5:
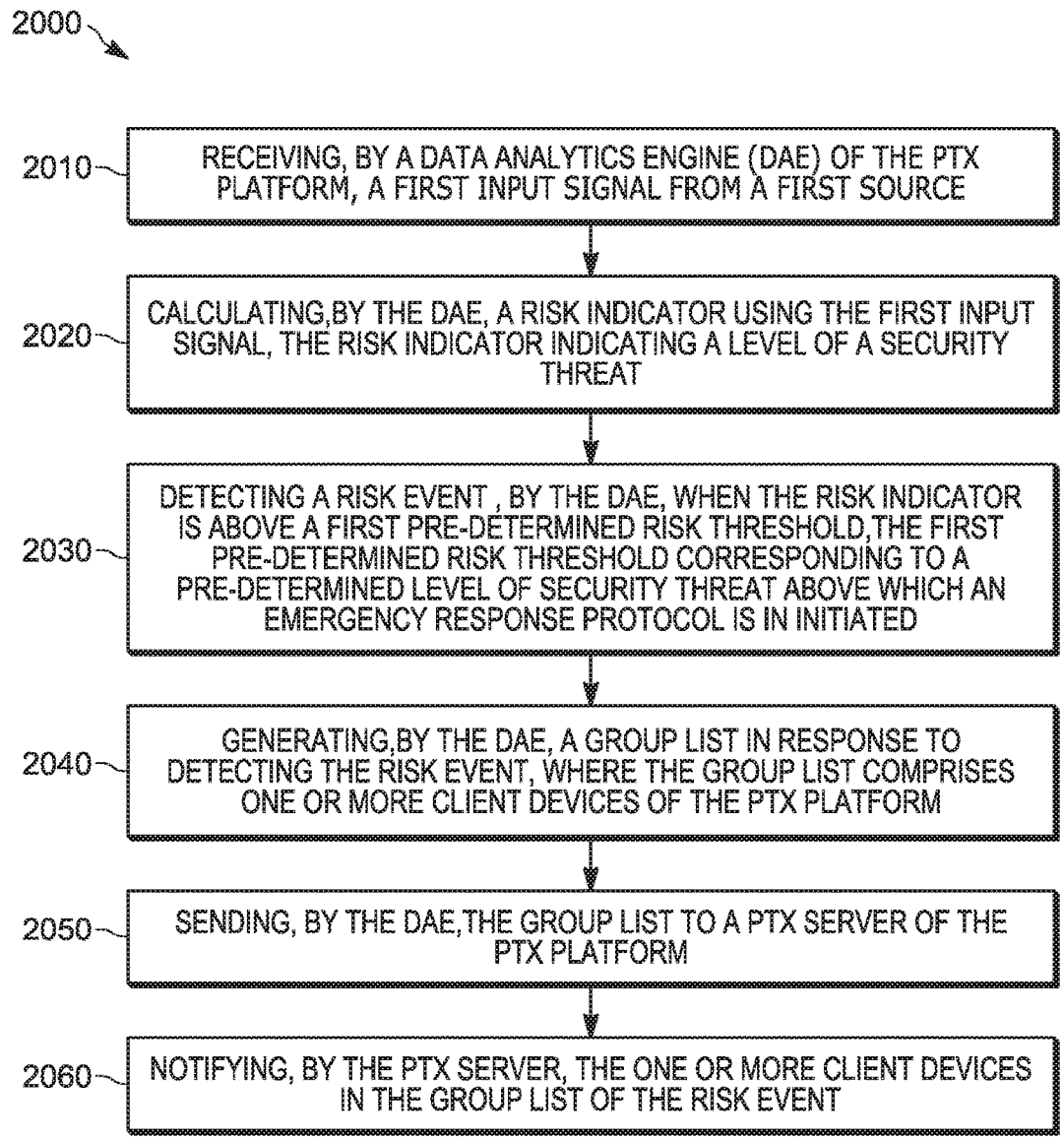
FIG. 5 is a flow diagram of a method of operating a PTX platform, in accordance with some embodiments.
Figure 6:
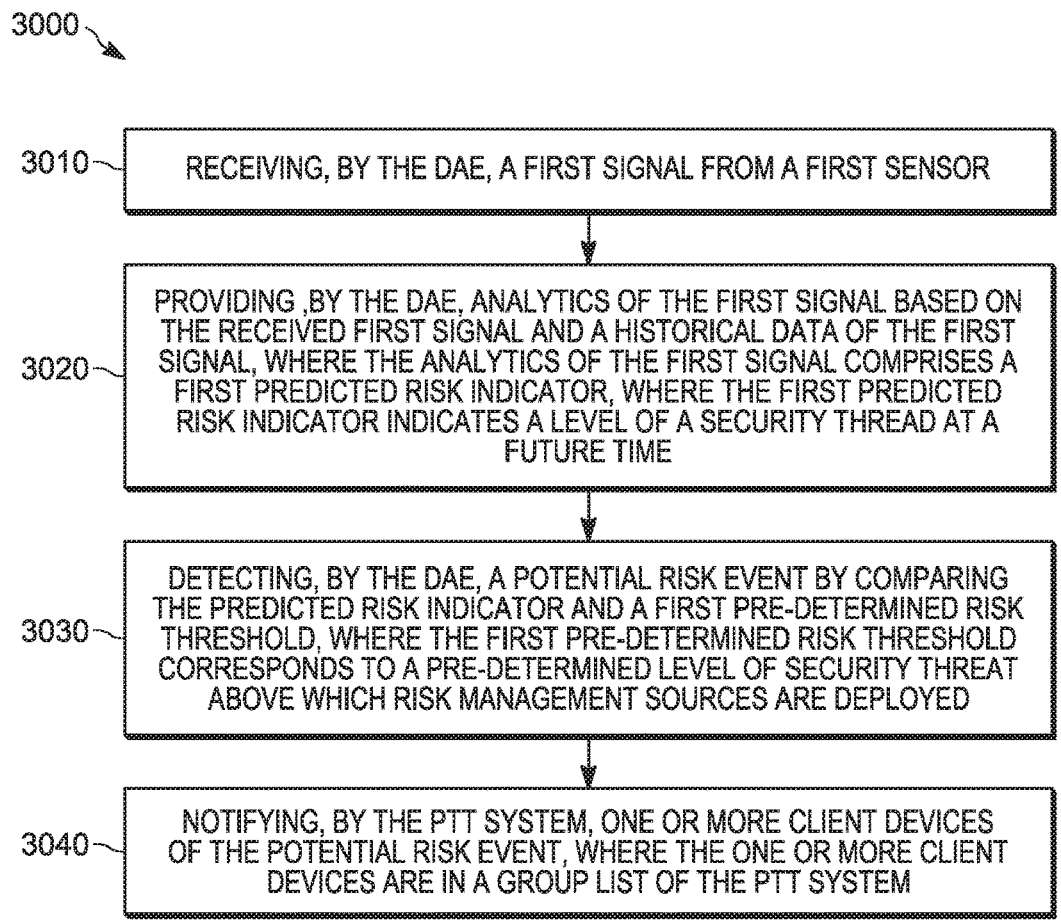
FIG. 6 is a flow diagram of a method of operating a PTT system, in accordance with some embodiments.

FIG. 5 illustrates a flow chart of a method of operating a PTX platform, in accordance with some embodiments. FIG. 6 illustrates a flow chart of a method of operating a PTT system, in accordance with some embodiments. It should be understood that the embodiment methods shown in FIGS. 5 and 6 are merely examples of many possible embodiment methods. One of ordinary skill in the art would recognize many variations, alternatives, and modifications. For example, various steps as illustrated in FIGS. 5 and 6 may be added, removed, replaced, rearranged and repeated.

Referring to FIG. 5, at block 2010, a data analytics engine (DAE) of the PTX platform receives a first input signal from a first input source. At block 2020, the DAE calculates a risk indicator using the first input signal, the risk indicator indicating a level of a security threat. At block 2030, the DAE detects a risk event when the risk indicator is above a first pre-determined risk threshold, the first pre-determined risk threshold corresponding to a pre-determined level of security threat above which an emergency response protocol is initiated. At block 2040, the DAE generates a group list in response to detecting the risk event, where the group list comprises one or more client devices of the PTX platform. At block 2050, the DAE sends the group list to a PTX server of the PTX platform. At block 2060, the PTX server notifies the one or more client devices in the group list of the risk event.

Referring to FIG. 6, at block 3010, the DAE receives a first signal from a first sensor. At block 3020, the DAE provides analytics of the first signal based on the received first signal and a historical data of the first signal, where the analytics of the first signal comprises a first predicted risk indicator, where the first predicted risk indicator indicates a level of a security threat at a future time. At block 3030, the DAE detects a potential risk event by comparing the first predicted risk indicator and a first pre-determined risk threshold, where the first pre-determined risk threshold corresponds to a pre-determine level of security threat above which risk management sources are deployed. At block 3040, the PTT system notifies one or more client devices of the potential risk event, where the one or more client devices are in a group list of the PTT system.

Figure 7:
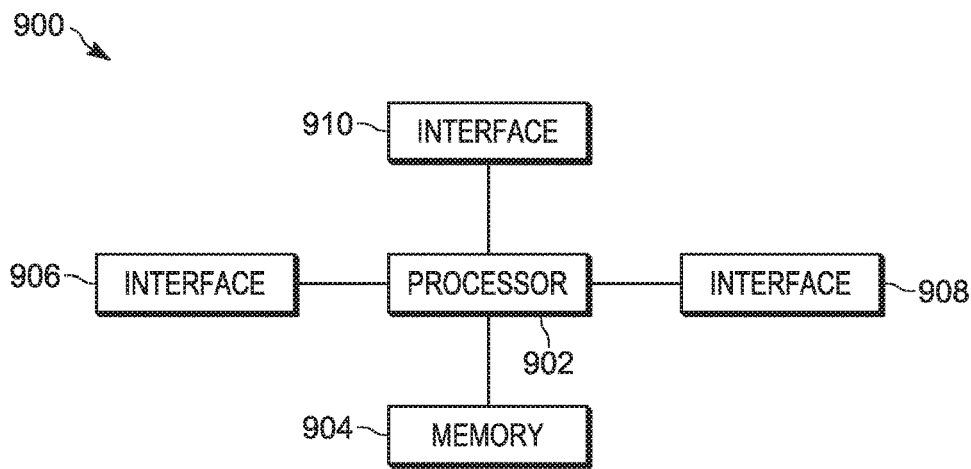
FIG. 7 is a block diagram of an embodiment processing system for performing methods described in FIGS. 5 and 6, in accordance some embodiments.

FIG. 7 is a block diagram of an embodiment processing system 900 for performing methods described herein, which may be installed in a host device (e.g., a PTT server, or a client device). As shown, the processing system 900 includes a processor 902, a memory 904, and interfaces 906-910, which may (or may not) be arranged as shown in FIG. 7. The processor 902 may be any component or collection of components adapted to perform computations and/or other processing related tasks, and the memory 904 may be any component or collection of components adapted to store programming and/or instructions for execution by the processor 902. In an embodiment, the memory 904 includes a non-transitory computer readable medium. The interfaces 906, 908, 910 may be any component or collection of components that allow the processing system 900 to communicate with other devices/components and/or a user. For example, one or more of the interfaces 906, 908, 910 may be adapted to communicate data, control, or management messages from the processor 902 to applications installed on the host device and/or a remote device. As another example, one or more of the interfaces 906, 908, 910 may be adapted to allow a user or user device (e.g., personal computer (PC), etc.) to interact/communicate with the processing system 900. The processing system 900 may include additional components not depicted in FIG. 22, such as long term storage (e.g., non-volatile memory, etc.).

In some embodiments, the processing system 900 is included in a network device that is accessing, or part otherwise of, a telecommunications network. In one example, the processing system 900 is in a network-side device in a wireless or wireline telecommunications network, such as a base station, a relay station, a scheduler, a controller, a gateway, a router, an applications server, or any other device in the telecommunications network. In other embodiments, the processing system 900 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 8:
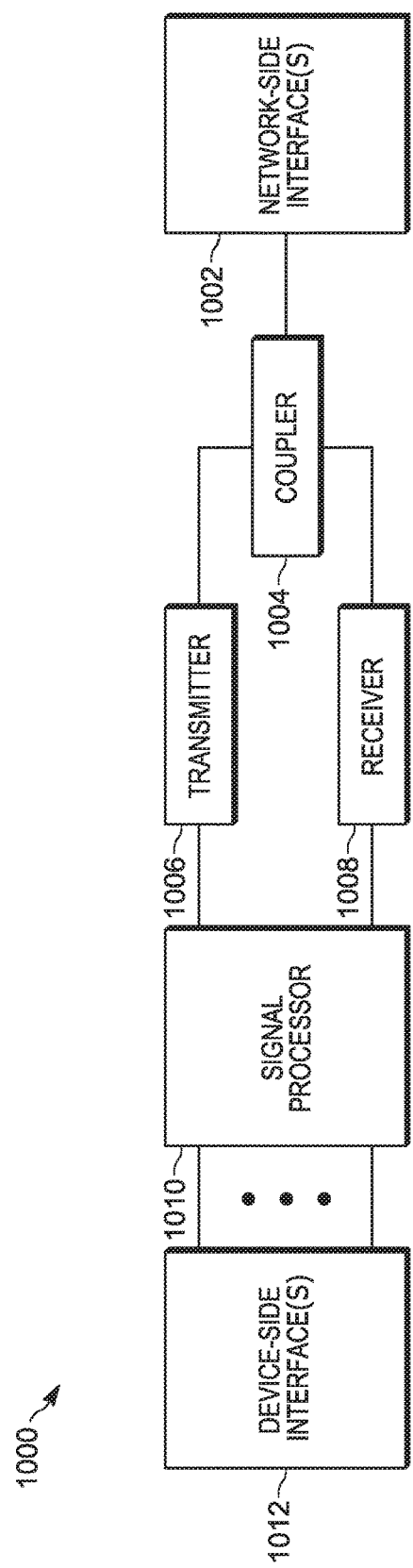
FIG. 8 is a block diagram of a transceiver adapted to transmit and receive signaling over a telecommunications network, in accordance with some embodiments.

In some embodiments, one or more of the interfaces 906, 908, 910 connects the processing system 900 to a transceiver adapted to transmit and receive signaling over the telecommunications network. FIG. 8 is a block diagram of a transceiver 1000 adapted to transmit and receive signaling over a telecommunications network. The transceiver 1000 may be installed in a host device. As shown, the transceiver 1000 comprises a network-side interface 1002, a coupler 1004, a transmitter 1006, a receiver 1008, a signal processor 1010, and a device-side interface 1012. The network-side interface 1002 may include any component or collection of components adapted to transmit or receive signaling over a wireless or wireline telecommunications network. The coupler 1004 may include any component or collection of components adapted to facilitate bi-directional communication over the network-side interface 1002. The transmitter 1006 may include any component or collection of components (e.g., up-converter, power amplifier, etc.) adapted to convert a baseband signal into a modulated carrier signal suitable for transmission over the network-side interface 1002. The receiver 1008 may include any component or collection of components (e.g., down-converter, low noise amplifier, etc.) adapted to convert a carrier signal received over the network-side interface 1002 into a baseband signal. The signal processor 1010 may include any component or collection of components adapted to convert a baseband signal into a data signal suitable for communication over the device-side interface(s) 1012, or vice-versa. The device-side interface(s) 1012 may include any component or collection of components adapted to communicate data-signals between the signal processor 1010 and components within the host device (e.g., the processing system 900, local area network (LAN) ports, etc.).

The transceiver 1000 may transmit and receive signaling over any type of communications medium. In some embodiments, the transceiver 1000 transmits and receives signaling over a wireless medium. For example, the transceiver 1000 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 1002 comprises one or more antenna/radiating elements. For example, the network-side interface 602 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1000 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

In some embodiments, a method of operating a push-to-anything (PTX) platform includes: receiving, by a data analytics engine (DAE) of the PTX platform, a first input signal from a first input source; calculating, by the DAE, a risk indicator using the first input signal, the risk indicator indicating a level of a security threat; detecting a risk event, by the DAE, when the risk indicator is above a first pre-determined risk threshold, the first pre-determined risk threshold corresponding to a pre-determine level of security threat above which an emergency response protocol is initiated; generating, by the DAE, a group list in response to detecting the risk event, where the group list comprises one or more client devices of the PTX platform; sending, by the DAE, the group list to a PTX server of the PTX platform; and notifying, by the PTX server, the one or more client devices in the group list of the risk event.

In some embodiments, a method of operating a push-to-talk (PTT) system having a data analytics engine (DAE) includes: receiving, by the DAE, a first signal from a first sensor; providing, by the DAE, analytics of the first signal based on the received first signal and a historical data of the first signal, where the analytics of the first signal comprises a first predicted risk indicator, where the first predicted risk indicator indicates a level of a security threat at a future time; detecting, by the DAE, a potential risk event by comparing the first predicted risk indicator and a first pre-determined risk threshold, where the first pre-determined risk threshold corresponds to a pre-determine level of security threat above which risk management sources are deployed; and notifying, by the PTT system, one or more client devices of the potential risk event, where the one or more client devices are in a group list of the PTT system.

In some embodiments, a push-to-anything (PTX) system includes a data analytics engine (DAE), where the DAE is configured to: receive a first signal from a first source; calculate a first risk indicator using the first signal, the first risk indicator indicating a level of a first security threat; detect a risk event when the first risk indicator is above a first pre-determined risk threshold, the first pre-determined risk threshold corresponding to a pre-determine level of the first security threat above which an emergency response protocol is initiated; generate a first group list in response to detecting the risk event, where the first group list comprises one or more client devices of the PTX system; and send the first group list to a PTX server of the PTX system, where the PTX server is configured to notify the one or more client devices in the first group list of the risk event.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of operating a push-to-anything (PTX) platform, the method comprising:
receiving, by a data analytics engine (DAE) of the PTX platform, a first input signal from a first input source;
calculating, by the DAE, a risk indicator using the first input signal, the risk indicator indicating a level of a security threat, wherein the DAE calculates the risk indicator using the first input signal and a historical record of the first input signal;
detecting a risk event, by the DAE, when the risk indicator is above a first pre-determined risk threshold, the first pre-determined risk threshold corresponding to a pre-determined level of security threat above which an emergency response protocol is initiated;

generating, by the DAE, a group list in response to detecting the risk event, wherein the group list comprises one or more client devices of the PTX platform;

sending, by the DAE, the group list to a PTX server of the PTX platform; and notifying, by the PTX server, the one or more client devices in the group list of the risk event.

2. The method of claim 1, wherein the group list is dynamically generated based on one or more attributes of the input signal.

3. The method of claim 2, wherein the one or more attributes of the input signal comprise an incident type of the risk event, a location of the risk event, or time of the risk event.

4. The method of claim 3, wherein the group list is dynamically generated based on additional information that comprises a shift schedule of emergency response personnel and available resources for emergency response.

5. The method of claim 1, further comprising:
receiving, by the DAE, a second input signal from a second input source, wherein the DAE calculates the risk indicator using the first input signal and the second input signal.

6. The method of claim 5, wherein the first input source and the second input source have different sensors.

7. The method of claim 1, wherein the first input signal is a streaming data within a set time period, wherein the DAE calculates the risk indicator by continuously analyzing the streaming data within the set time period.

8. The method of claim 1, wherein the first input signal comprises a plurality of data points that are sampled at a plurality of discrete time slots, wherein the DAE updates the calculated risk indicator in response to an incoming data sample of the first input signal.

9. The method of claim 1, wherein the notifying comprises sending text, data, audio message, or video message to the one or more client devices in the group list.

10. The method of claim 1, wherein the first input signal is a sensor signal of an air tank, and the risk indicator indicates the likelihood that a remaining amount of oxygen in the air tank is below a pre-determined amount of oxygen in the air tank.

11. The method of claim 1, wherein the first input signal is a sensor signal of a temperature sensor, and the risk indicator indicates the likelihood that a fire breaks out.

12. The method of claim 11, wherein the risk indicator is calculated using a history data base of the ambient temperature of the temperature sensor, the time when the sensor signal was sampled, and the season when the sensor signal was sampled.

13. The method of claim 1, further comprising:
deploying, by the DAE, a drone to a location indicated by the first input signal;
receiving, by the DAE, sensor data sent by the drone; and
relaying, by the DAE, the sensor data sent by the drone to the one or more client devices in the group list.

14. A method of operating a push-to-talk (PTT) system, the PTT system comprising a data analytics engine (DAE), the method comprising:
receiving, by the DAE, a first signal from a first sensor;
providing, by the DAE, analytics of the first signal based on the received first signal and a historical data of the first signal, wherein the analytics of the first signal comprises a first predicted risk indicator, wherein the first predicted risk indicator indicates a level of a security threat at a future time;

detecting, by the DAE, a potential risk event by comparing the first predicted risk indicator and a first pre-determined risk threshold, wherein the first pre-determined risk threshold corresponds to a pre-determine level of security threat above which risk management sources are deployed; and notifying, by the PTT system, one or more client devices of the potential risk event, wherein the one or more client devices are in a group list of the PTT system.

15. The method of claim 14 further comprising:
receiving, by the DAE, a second signal from a second sensor, wherein the first sensor and the second sensor are different types of sensors; and
calculating, by the DAE, a second predicted risk indicator, wherein the second predicted risk indicator indicates a level of the security threat at the future time, wherein the DAE detects the potential risk event using the first predicted risk indicator and the second predicted risk indicator.

16. The method of claim 15, further comprising, before notifying the one or more client devices:
dynamically generating, by the DAE, the group list based on at least an incident type of the potential risk event and a location of the potential risk event.

17. A push-to-anything (PTX) system comprising:
a data analytics engine (DAE), wherein the DAE is configured to:
receive a first signal from a first source;
calculate a first risk indicator using the first signal, the first risk indicator indicating a level of a first security threat;
detect a risk event when the first risk indicator is above a first pre-determined risk threshold, the first pre-determined risk threshold corresponding to a pre-determine level of the first security threat above which an emergency response protocol is initiated;
generate a first group list in response to detecting the risk event, wherein the first group list comprises one or more client devices of the PTX system;
send the first group list to a PTX server of the PTX system, wherein the PTX server is configured to notify the one or more client devices in the first group list of the risk event;
receive a second signal from a second source;
calculate a second risk indicator using the second signal and a history record of the second signal, the second risk indicator indicating a predicted level of a second security threat at a future time;
identify a potential risk event when the second risk indicator is above a second pre-determined risk threshold;
generate a second group list comprising one or more client devices of the PTX system; and
send the second group list to a push-to-talk (PTT) server of the PTX system, wherein the PTT server is configured to notify the one or more client devices in the second group list of the potential risk event.

18. The PTX system of claim 17, wherein the DAE is configured to:
update an algorithm of the DAE used for calculating the second risk indicator, based on whether or not the potential risk event actually happened; and
use the updated algorithm to calculate a third risk indicator indicating a predicated level of the second security threat at another future time.

* * * * *